Patented Jan. 2, 1923.

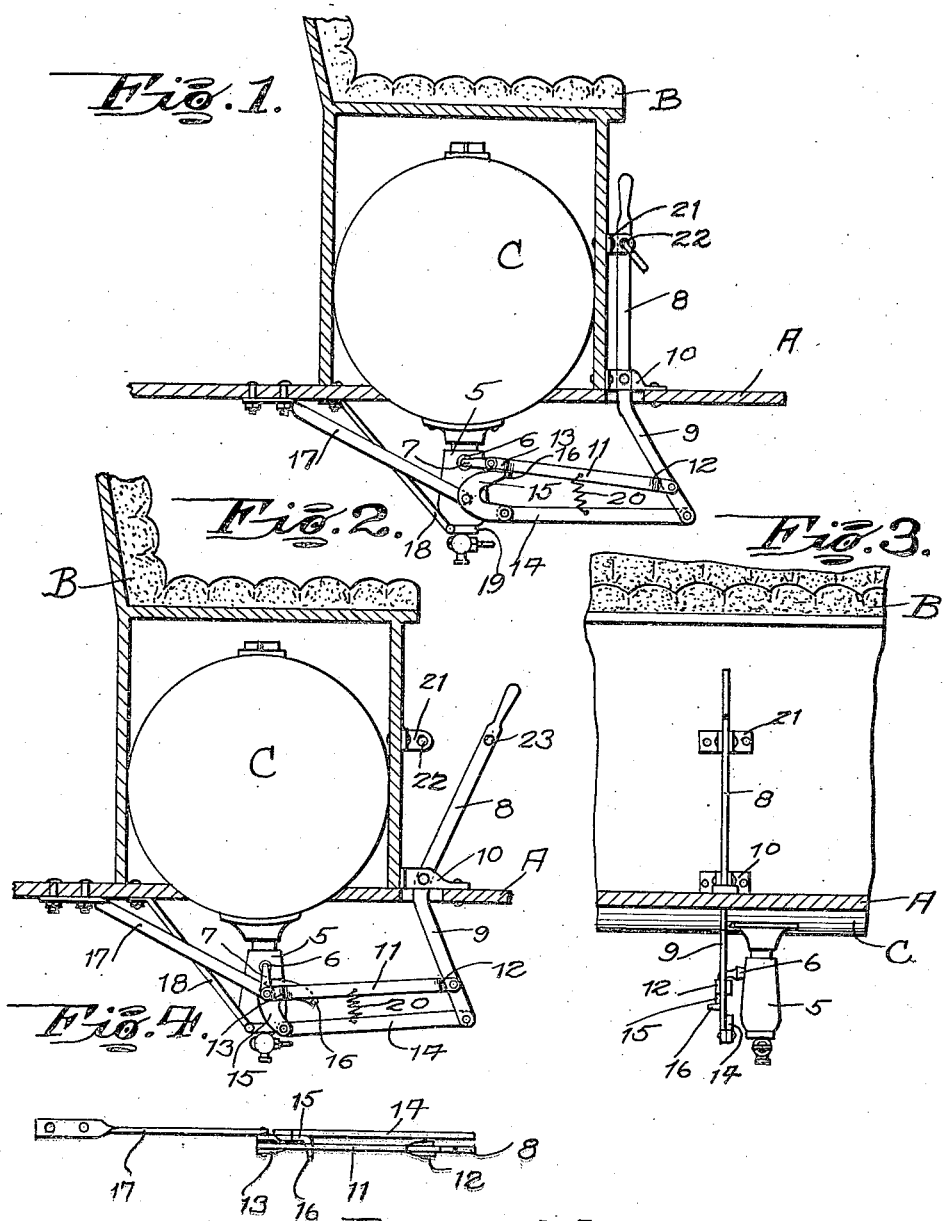

1,440,710

UNITED STATES PATENT OFFICE.

EMERY M. WELLS, OF NAPERVILLE, ILLINOIS.

VALVE-LOCKING DEVICE.

Application filed February 26, 1921. Serial No. 448,214.

*To all whom it may concern:*

Be it known that I, EMERY M. WELLS, a citizen of the United States, residing at Naperville, in the county of Du Page and State of Illinois, have invented certain new and useful Improvements in Valve-Locking Devices, of which the following is a specification, reference being had to the accompanying drawings.

This invention relates to valve locking devices and particularly to a valve locking device for the gasoline supply tank of an automobile.

An object of the invention is to provide a locking device of this character which is operable from the driver's seat to not only open and close the valve of the outlet, but to lock said valve in its closed position.

Another object is to provide a locking device of this character which is operated by a single lever from the driver's seat, said lever being adapted to open, close and lock the valve, said closing and locking operation being performed with one movement of the lever.

A still further object of the invention is to provide a locking device of this character including an operating lever which is operably connected to a valve stem and wherein means are provided to prevent movement of the connecting means independently of the lever when the valve is in its closed position.

With these and other objects in view, the invention consists in the improved construction and arrangement of parts to be hereinafter more particularly described, fully claimed and illustrated in the accompanying drawings, in which:—

Figure 1 is a sectional view of the vehicle seat structure showing the invention applied and in its closed position;

Figure 2 is a vertical elevation showing the invention in its open position;

Figure 3 is a front elevation; and

Figure 4 is a detail view of the locking device.

Referring to the drawings, A designates the body of an automobile or like vehicle, including a front or driver's seat B.

Disposed beneath the seats B is a gasoline supply tank C of well-known construction, said tank having a sediment bulb and outlet 5 controlled by a valve 6, said valve including a right angularly extending handle 7.

In order to lock the fuel supply to prevent theft of the automobile, or theft of the gasoline, there is provided a novel locking mechanism comprising an operating lever 8 having its end 9 extended in angular relation to the lever, said lever being pivoted by means of a bracket 10 to the body of the vehicle adjacent the floor and base of the front seat, the pivot pin of the lever being disposed at the junction of the portion 9 with the lever proper 8. By this arrangement, the end 9 of the lever extends through the floor of the body, the opening through which the lever extends being sufficiently wide to permit uninterrupted oscillation of the end 9.

A connection link 11 is provided, each end of said link being bifurcated. The end 12 of said link is pivoted to the end portion 9 of the lever in spaced relation to the extremity of said portion 9, while the end 13 of the link is pivoted to the end portion of the handle 7 of the valve. It is of course obvious that the stem of the valve 6 extends transversely of the body and longitudinally of the tank C, so that movement of the link 11 will cause oscillation of the valve to open and close the same, this operation being performed by movement of the lever without requiring the operator to leave the seat B.

Pivoted to the extremity of the end portion 9 of the lever is a second connecting link 14, while pivoted to the free end of said link is a latch member 15. This latch member is substantially U-shaped, the free arm of said U-shaped latch being extended at right angles to said member to provide a lock finger 16. A supporting rod 17 is secured at one end to the body of the vehicle remote from the lever 8, the opposite end of the rod being disposed adjacent the latch member 15, said latch being pivoted to the rod in spaced relation to the pivotal connection of the latch to the link 14. By this means the latch is normally maintained adjacent the valve 6 and is adapted to swing on its pivotal connection to the rod 17 through the medium of the link 14. In order to render the device substantial, a brace 18 is provided, said brace being secured to the body portion adjacent the rod 17, and having its opposite end formed into a hook 19 adapted to engage the drain cock of the sediment bulb. A spring 20 is disposed between the links 11 and 14 and is secured to said links by having its ends pass therethrough, said spring assisting in the operation of the locking device.

When it is desired to lock the gasoline supply, the lever 8 is moved upwardly toward the seat B. This causes the link 11 to oscillate the valve 6 and close the same. During this movement the link 14 also causes the latch member to swing rearwardly or toward the rod 17 so as to permit the locking finger 16 to engage the end portion 13 of the link 11, to prevent movement of said link independently of the lever 8. By this simple movement of the lever the valve is not only closed but the locking device is swung into place, rendering it impossible to open the valve without first operating the lever. When the lever is swung downwardly toward the floor of the automobile to open the valve, the spring 20 assists the valve parts in their return movement to their normal position. When the lever is disposed parallel to the front portion of the seat B it is locked thereto. This is accomplished by securing a hasp member 21 to the front portion of the seat B, said hasp member being provided with an opening 22. The lever 8 is also provided with an opening 23 adapted to register with the opening 22. A conventional form of lock is then passed through the hasp and lever so as to lock the lever and the valve in closed position.

From the foregoing it will be readily seen that this invention provides a novel locking device for the fuel supply tank of an automobile capable of being opened, closed and locked without requiring the driver to leave the seat, and its construction is such that alterations are not necessary in order to apply the device to an automobile.

What is claimed is:—

1. A valve locking device of the character described comprising a valve having a valve stem, an operating lever, and a link operatively connecting the valve stem to the lever, a second link carried by the lever, and means carried by said second link and cooperating with the first mentioned link to prevent movement of said first mentioned link independently of the lever.

2. A valve locking device of the character described comprising a valve having a handle, an operating lever, and a link connecting the valve handle to the lever, and a second link pivoted to the lever, a latch member pivoted to the second link and to a support, said latch member being movable upon movement of the lever in one direction, into engagement with the first mentioned link, when the latter has been moved to its closed position by the lever.

3. A locking device for the fuel supply of an automobile comprising a fuel supply outlet valve having a handle, a lever pivoted to the body of the automobile, a link pivoted at one end to the lever and at its opposite end to the handle of the valve, a second link pivoted to the end of the lever, a support secured to the automobile and extending toward the second link, and a latch member pivoted to the support and the second link, said latch member being movable into engagement with the first mentioned link when the valve is disposed in its closed position.

4. A valve actuating and locking device of the character described comprising a valve stem having a handle, a lever pivoted in spaced relation to the valve, a pair of links pivoted to said lever in substantially spaced relation to each other, one of said links being connected to the handle of the valve, the remaining link having a latch member pivoted thereto, said latch member being also pivoted to a support and movable simultaneously with the links upon movement of the lever.

In testimony whereof I hereunto affix my signature.

EMERY M. WELLS.